United States Patent
Dong et al.

(10) Patent No.: US 10,851,692 B2
(45) Date of Patent: Dec. 1, 2020

(54) METHOD FOR MONITORING COMPONENTS IN AN EXHAUST AFTERTREATMENT SYSTEM AND ENGINE ARRANGEMENT INCLUDING EXHAUST AFTERTREATMENT SYSTEM MONITORING ARRANGEMENT

(71) Applicants: VOLVO TRUCK CORPORATION, Gothenburg (SE); Qunlong Dong, Frederick, MD (US); Chun Tai, Hagerstown, MD (US)

(72) Inventors: Qunlong Dong, Frederick, MD (US); Chun Tai, Hagerstown, MD (US)

(73) Assignee: Volvo Truck Corporation, Gothenburg (SE)

( * ) Notice: Subject to any disclaimer, the term of this patent is extended or adjusted under 35 U.S.C. 154(b) by 21 days.

(21) Appl. No.: 16/476,271

(22) PCT Filed: Jan. 24, 2017

(86) PCT No.: PCT/US2017/014763
§ 371 (c)(1),
(2) Date: Jul. 6, 2019

(87) PCT Pub. No.: WO2018/139992
PCT Pub. Date: Aug. 2, 2018

(65) Prior Publication Data
US 2019/0353065 A1    Nov. 21, 2019

(51) Int. Cl.
*F01N 11/00*    (2006.01)
*F01N 3/021*    (2006.01)
(Continued)

(52) U.S. Cl.
CPC ............. *F01N 3/021* (2013.01); *F01N 3/103* (2013.01); *F01N 3/2066* (2013.01);
(Continued)

(58) Field of Classification Search
CPC ............... F01N 3/2066; F01N 2560/14; F01N 2560/025; F01N 2560/026; F01N 2900/04; F01N 2900/1621
See application file for complete search history.

(56) References Cited

U.S. PATENT DOCUMENTS 8,539,824 B2   9/2013   Van Nieustadt et al.
8,826,644 B2   9/2014   Ponnathpur
(Continued)

OTHER PUBLICATIONS

International Search Report (dated Apr. 5, 2017) for corresponding International App. PCT/US2017/014763.
(Continued)

*Primary Examiner* — Jonathan R Matthias
(74) *Attorney, Agent, or Firm* — WRB-IP LLP

(57) ABSTRACT

A method and engine arrangement are provided for monitoring components in an exhaust aftertreatment system (EATS) including a diesel oxidation catalyst (DOC), a diesel particulate filter (DPF), and a selective catalytic reduction catalyst (SCR). A first O2 level is measured at a first location between the DOC and the DPF, a second O2 level is measured at a second location downstream of the SCR, a first NOx level is measured at, the first location, a second NOx level is measured at the second location, SCR efficiency is calculated based on the first and second NOx levels, and whether the DOC, the DPP. and the SCR are functioning property is determined based on whether the first O2 level is within a first O:2 target, whether the second O2 level is within a second O2 target, and whether SCR efficiency is within an SCR efficiency target.

20 Claims, 1 Drawing Sheet

(51) Int. Cl.
*F01N 3/10* (2006.01)
*F01N 3/20* (2006.01)

(52) U.S. Cl.
CPC .. *F01N 2560/025* (2013.01); *F01N 2560/026* (2013.01); *F01N 2560/06* (2013.01); *F01N 2560/14* (2013.01); *F01N 2900/1621* (2013.01)

(56) References Cited

U.S. PATENT DOCUMENTS

| | | |
|---|---|---|
| 9,435,246 B2 | 9/2016 | Devarakonda |
| 2010/0139246 A1 | 6/2010 | Andersson et al. |
| 2010/0139250 A1 | 6/2010 | Andersson et al. |
| 2014/0010745 A1* | 1/2014 | Pfister ................. F01N 3/2033 423/212 |
| 2014/0144125 A1 | 5/2014 | Cavataio et al. |
| 2015/0096283 A1 | 4/2015 | Dong et al. |
| 2016/0326928 A1 | 11/2016 | Osborne et al. |
| 2017/0145893 A1* | 5/2017 | Kidokoro ........... B01D 53/9418 |

OTHER PUBLICATIONS

European Official Action (dated May 14, 2020) for corresponding European App. EP 17 89 3795.

* cited by examiner

_US 10,851,692 B2_

1

METHOD FOR MONITORING COMPONENTS IN AN EXHAUST AFTERTREATMENT SYSTEM AND ENGINE ARRANGEMENT INCLUDING EXHAUST AFTERTREATMENT SYSTEM MONITORING ARRANGEMENT

BACKGROUND AND SUMMARY

The present invention relates generally to exhaust aftertreatment systems and, more particularly, to methods and arrangements for monitoring components of such systems.

Modern emissions requirements call for a variety of exhaust aftertreatment system (EATS) components to treat diesel engine exhaust. This EATS equipment will typically include a diesel oxidation catalyst (DOC), a diesel particulate filter (DPF), and a selective catalytic reduction catalyst (SCR), and the engine itself can be operated according to various engine control strategies (e.g., low NOx exhaust mode, heat mode) to facilitate obtaining a particular exhaust quality or for other purposes such as regeneration of equipment. The environment in such exhaust systems is harsh and equipment used in the EATS and for monitoring the functioning of the equipment must be robust. It is desirable to provide a method and arrangement that can monitor the functioning of EATS components that is substantially robust, and with minimal additional equipment.

In accordance with an aspect of the present invention, a method is provided for monitoring components in an exhaust aftertreatment system (EATS) comprising, in order from upstream to downstream, a diesel oxidation catalyst (DOC), a diesel particulate filter (DPF), and a selective catalytic reduction catalyst (SCR). The method comprises measuring a first O2 level at a first location between the DOC and the DPF, measuring a second O2 level at a second location downstream of the SCR, measuring a first NOx level at the first location, measuring a second NOx level at the second location, calculating SCR efficiency based on the first and second NOx levels, and determining whether the DOC, the DPF, and the SCR are functioning properly based on whether the first O2 level is within a first O2 target, whether the second O2 level is within a second O2 target, and whether SCR efficiency is within an SCR efficiency target.

In accordance with another aspect of the invention, an engine arrangement with an exhaust after treatment system (EATS) monitoring arrangement comprises an engine with an exhaust line, an EATS attached to the exhaust line, the EATS comprising, in order from upstream to downstream, a diesel oxidation catalyst (DOC), a diesel particulate filter (DPF), and a selective catalytic reduction catalyst (SCR), means for measuring a first O2 level at a first location between the DOC and the DPF, means for measuring a second O2 level at a second location downstream of the SCR, means for measuring a first NOx level at the first location, means for measuring a second NOx level at the second location, and a controller configured to calculate SCR efficiency based on the first and second NOx levels and to determine whether the DOC, the DPF, and the SCR are functioning properly based on whether the first O2 level is within a first O2 target, whether the second O2 level is within a second O2 target, and whether SCR efficiency is within an SCR efficiency target.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
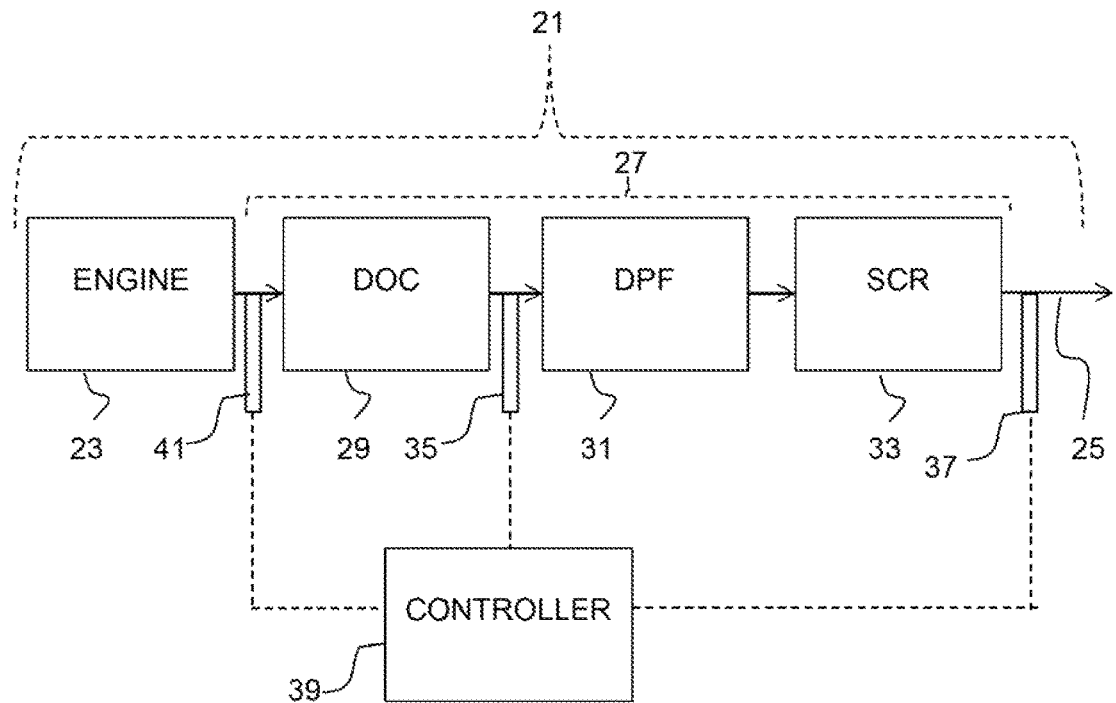
FIG. 1 is a schematic drawing of an engine arrangement according to an aspect of the present invention.

FIG. 1 shows an engine arrangement with an exhaust after treatment system (EATS) monitoring arrangement 21 (hereinafter engine arrangement) according to an aspect of the present invention. The engine arrangement 21 includes an engine 23 with an exhaust line 25. An EATS 27 is attached to the exhaust line 25. The EATS 27 comprises, in order from upstream to downstream, a diesel oxidation catalyst (DOC) 29, a diesel particulate filter (DPF) 31, and a selective catalytic reduction catalyst (SCR) 33. A first sensor arrangement 35 is provided in the exhaust line 25 between the DOC 29 and the DPF 31, and a second sensor arrangement 37 is provided in the exhaust line downstream of the SCR 33. The first and second sensor arrangements 35 and 37 may be NOx sensors that also measure O2 levels, or may be separate sensors that individually measure NOx or O2. Except where otherwise indicated, the logic for practicing the method and arrangement according to the present invention is substantially the same, regardless whether the sensor type is a NOx sensor or an O2 sensor or a NOx/O2 dual output sensor and the measurements in question are of NOx levels or O2 levels or NOx/O2 levels.

Most modern EATS include two NOx sensors, one between DPF and SCR and one after SCR. In the present invention, the first sensor arrangement 35 may be the sensor that is ordinarily between the DPF 31 and the SCR 33 moved upstream from that location to between the DOC 29 and DPF. Alternatively, the first sensor arrangement 35 may be an additional sensor added between DOC and DPF in addition to the sensors that are ordinarily already provided.

A controller 39, such as an engine control unit (ECU), is configured to receive a signal from the first sensor arrangement 35 indicating whether O2 levels (O2_1 (FIG. 2)) measured by the first sensor arrangement are within or above a first predetermined range of O2 levels and a signal from the second sensor arrangement 37 is whether O2 levels (O2_2 (FIG. 2)) measured by the second O2 sensor are within or above a second predetermined range of O2 levels. The controller 39 is arranged to calculate whether SCR 33 efficiency SCReff.1 or SCReff.2 (FIG. 2) is below, within, or above a predetermined efficiency target. SCReff.1 and SCReff.2 are typically determined according to an equation based on NOx1 and NOx2 wherein:

$$SCReff. = [1-(NOx1-NOx2)/NOx1)] \times 100 \quad (1)$$

The SCReff.1 target is selected for low temperature operating conditions, such as in the range of 200-250° C., while the SCReff.2 target is selected for normal operating conditions, typically temperatures above about 250° C. to 270° C., more typically above about 300° C. References to "low temperature" and "normal operating conditions" refer in this context to SCR temperatures. Temperatures that persons skilled in the art would consider to be low or normal operating temperatures might differ from one engine arrangement to another. While different engine arrangements might have different efficiency targets at different operating temperatures, in a typical engine arrangement of the type used in, for example, a heavy truck, the SCReff.1 target value might be about 75%, while the SCReff.2 target value might be about 95% or higher.

At lower SCR tempenures, typically below about 250° C., SCR efficiency is more sensitive to the NO to NO2 ratio in the feedgas (gas entering the SCR) than at normal operating temperatures. Three main reactions occur in the SCR. The first reaction is:

$$NO+NO2+2NH3 \rightarrow 2N2+3H2O \quad (2)$$

The reaction shown in equation (2) calls for an NO/NO2 ratio of 1:1 in the feedgas. This is a particularly desirable reaction because it occurs about ten times faster than the other reactions that occur in the SCR. The reaction shown in equation (2) will ordinarily occur at both high and low temperatures and is the most desirable reaction, particularly at lower temperatures, so providing feedgas with an NO/NO2 ratio of 1:1 is particularly desirable at lower temperatures to encourage the reaction shown in equation (2). Another reaction that occurs is:

$$NO+4NH3+O2 \rightarrow 4N2+6H2O \quad (3)$$

The reaction shown in equation (3) is typically considered to be the "standard" reaction that occurs in the SCR. The reaction shown in equation (3) occurs more slowly than the reaction shown in equation (2). The reaction of equation (3) calls only for NO in the feedgas and tends to occur primarily at normal operating temperatures and less at lower operating temperatures. A third reaction that occurs is:

$$2NO2+4NH3+O2 \rightarrow 3N2+6H2O \quad (4)$$

The reaction shown in equation (4) occurs more slowly than the reactions shown in equations (2) and (3). The reaction of equation (4 calls only for NO2 in the feedgas and tends to occur primarily at noun& operating temperatures and less at lower operating temperatures.

Because the reactions shown M equations (3) and (4) tend to occur more readily at normal or higher operating temperatures, the NO/NO2 ratio in the feedgas is not as important to SCR efficiency at normal operating temperatures as it is at lower operating temperatures. At lower temperatures, having an NO/NO2 ratio (,)f about 1:1 in the feedgas tends to be important to obtaining good SCR efficiency. If the NO/NO2 ratio in the feedgas to the SCR is low at low operating temperatures, the SCR efficiency will also be low (below the SCReff.1 target) and that is typically a symptom that the DOC 29 and/or the DPF 31 are not functioning properly.

Figure 2:
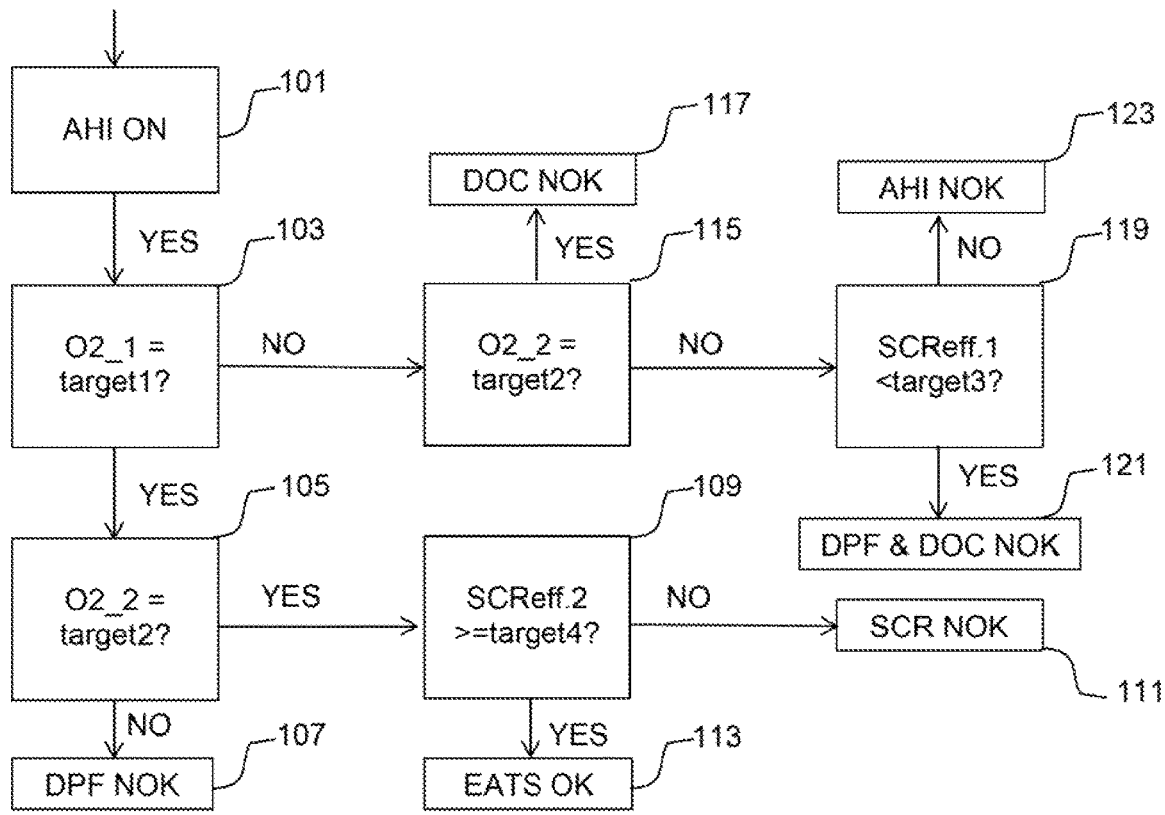
FIG. 2 is a flowchart showing steps in a method according to an aspect of the present invention.

The controller 39 is configured to determine whether the DOC, the DPF, and the SCR are functioning properly based on the O2 levels (O2_1 (FIG. 2)) measured by the first sensor arrangement 35, the O2 levels (O2_2 (FIG. 2)) measured by the second sensor arrangement 37, and the SCR efficiency SCReff.1 and SCReff.2 (FIG. 2).

The engine arrangement 21 may further comprise an aftertreatment hydrocarbon injection nozzle 41 (AHI) upstream of the DOC 29. The controller 39 can be configured to determine whether the AHI 41 is functioning properly based on the O2 levels (O2_1 (FIG. 2)) measured by the first sensor arrangement 35, the O2 levels (O2_2 (FIG. 2)) measured by the second sensor arrangement 37, and the SCR 33 efficiency SCReff.1 (FIG. 2).

Table 1 illustrates bow different Measurements of O2_1 and O2_2 and calculations of SCReff.1 and SCReff.2 can be used by the controller 39 to diagnose whether an device in the EATS 27 is functioning properly ("OK") or not functioning properly ("NOK"),

TABLE 1

| | O2_1 | O2_2 | SCReff.1 | SCReff.2 | DOC | DPF | AHI | SCR |
|---|---|---|---|---|---|---|---|---|
| 1 | =target1 | =target2 | — | >=target4 | OK | OK | OK | OK |
| 2 | =target1 | =target2 | — | <target 4 | OK | OK | OK | NOK |
| 3 | >target1 | =target2 | — | — | NOK | OK | OK | — |
| 4 | =target1 | >target2 | — | — | OK | NOK | OK | — |
| 5 | >target1 | >target2 | >=target3 | — | OK | OK | NOK | — |
| 6 | >target1 | >target2 | <target3 | — | NOK | NOK | OK | — |

As seen in row 3 in Table 1 above, the controller 39 can be configured to determine that the DOC 29 is not functioning properly when the O2 levels O2_1 measured by the first sensor arrangement 35 are outside (typically meaning above) the first predetermined range>target1), and the O2 levels O2_2 measured by the second sensor arrangement 37 are within the second predetermined range (target2). When O2_1 is high (>target it means either that the DOC 29 is not converting an expected percentage,e of fuel injected or that the AHI 41 is not injecting the expected amount of fuel. When O2_2 is within range (=target2), it means that the AHI 41 is injecting the expected amount of fuel. Therefore, it can be concluded that there is a problem with the DOC 29.

As seen in row 6 in Table 1 above, the controller 39 can also be configured to determine that the DOC 29 is not functioning properly and that the DPF 31 is not functioning properly when the O2 levels O2_1 measured by the first sensor arrangement 35 are outside (i.e. above) the first predetermined range (target1), the O2 levels O2_2 measured by the second sensor arrangement 37 are outside (i.e. above) the second predetermined range (>target2), and the SCR. 33 efficiency SCReff.1 is below the predetermined efficiency target (<target 3). This determination involves operation at low temperatures to determine if SCReff.1 is below the predetermined efficiency target (<target3). If O2_1 and O2_2 are both high (>target 1 and >target 2), this means that the DOC 29 and, or the DPF are not converting the expected percentage of fuel injected, or that the AHI 41 is not injecting the expected amount of fuel for the DOC and/or the DPF to convert. When SCReff.1 is low, this typically means that the feedgas entering the SCR 33 has a low NO/NO2 ratio which, in turn, means that the DOC 29 and/or the DPF 31 an not working properly.

As seen in row 5 in Table 1 above, the controller 39 can further be configured to determine that the AHI 41, if provided, is not functioning properly when the O2 levels O2_1 measured by the first sensor arrangement 35 are outside (i.e. above) the first predetermined range t>target 1), the O2 levels O2_2 measured by the second sensor arrangement 37 are outside (i.e. above) the second predetermined range (>target2), and the SCR efficiency SCReff.1 is greater than or equal to the predetermined efficiency target (>=target3). This determination involves operation at low temperatures to determine if SCReff.1 is greater than or equal to the predetermined efficiency target (>=target3). If O2_1 and O2_2 are both high (>target 1 and >target 2), this means that the DOC 29 and/or the DPF are not converting the expected percentage of fuel injected, or that the AHI 41 is not injecting the expected amount of fuel for the DOC and/or the DPF to convert. When SCReff.1 is on target, i.e., SCReff.1>=target 3, this typically means that the feedgas entering the SCR has a proper NO/NO2 ratio which, in turn, means that the DOC 29 and the DPF 31 are working properly, and it can be concluded that the AHI 41 is not operating properly.

As seen in row 4 in Table I above, the controller 39 can be configured to determine that the DPF 31 is not functioning properly when the O2 levels O2_1 measured by the first sensor arrangement 35 are within the first predetermined range (=target1) and the O2 levels O2_2 measured by the second sensor arrangement 37 are outside (i.e., above) the second predetermined range (>target2). When O2_1 is within range (O2_1=target 1), this means that the DOC 29 is converting the expected percentage of fuel injected, and that the AHI 41 is injecting the expected amount of fuel. When O2_2 is high (>target 2), it means that either the DOC and/or the DPF 31 is not converting the expected percentage of fuel. Because it is known that the DOC is converting the expected percentage of fuel, it follows that there is a problem with the DPF 31.

As seen in row 2 in Table 1 above, the controller 39 can be configured to determine that the SCR 33 is not functioning properly when the O2 levels O2_1 measured by the first sensor arrangement 35 are within the first predetermined range (=target1) the O2 levels O2_2 measured by the second sensor arrangement 37 are within the second predetermined range (=target2), and the SCR 33 efficiency SCReff.2 is less (<target4) than the predetermined efficiency target. This determination involves normal operation of the engine to determine if SCReff.2 is less than the predetermined efficiency target (<target4). If O2_1 and O2_2 are within desired ranges, it can be concluded that the DOC 29 and DPF 31 are both operating properly and, if SCReff.2 is less than the predetermined range, by process of elimination, it is reasonable to conclude that there is a problem with the SCR 33.

As seen in row 1 in Table 1 above, the controller 39 can be configured to determine that the DOC 29, the DPF 31, the SCR 33, and the AHI 41, if provided, are functioning properly when the O2 levels O2_1 measured by the first sensor arrangement 35 are within the first predetermined range (=target1), the O2 levels O2_2 measured by the second sensor arrangement 37 are within the second predetermined range (=target2), and the SCR 33 efficiency SCReff2, is greater than or equal to the predetermined efficiency target (>xtarget4). This determination involves normal operation of the engine to determine if SCReff.2 is greater than or equal to the predetermined efficiency target (>xtarget4).

A flowchart illustrating a method according to another aspect of the present invention for monitoring components in the EATS 27 that comprises, in order from upstream to downstream, the DOC 29, the DPF 31, and the SCR 33, and a first sensor arrangement 35 between the DOC and the DPF, and a second sensor arrangement 37 downstream of the SCR is shown in FIG. 2. The EATS 27 may include an AHI nozzle 41 that may be operated at step 101.

At step 103, the first sensor arrangement 35 senses whether O2 levels O2_1 measured by the first sensor arrangement are within (=target1) or outside (i.e., typically meaning above) (>target1) a first predetermined range of O2 levels.

If the first sensor arrangement 35 senses that the O2 level O2_1 is within (=target1) the first predetermined range of O2 levels at step 103 then, at step 105, the second sensor arrangement 37 senses whether O2 levels O2_2 measured by the second sensor arrangement are within (=target2) or outside (i.e., typically meaning above) (>target2) a second predetermined range of O2 levels.

If, at step 105, it is determined that the ( ) levels O2_2 measured b the second sensor-arrangement 37 are outside (i.e. above) (>target 2) the second predetermined range, then it is determined at step 107 that there is a problem with the DPF 31. When O2_1 is within range (O2_1=target 1), this means that the DOC 29 is converting the expected percentage of fuel injected, and that the AHI 41 is injecting the expected amount of fuel. \When O2_2 is high (>target 2), it means that either the DOC and/or the DPF 31 is not converting the expected percentage of fuel. Because it is known that the DOC is convening the expected percentage of fuel because O2_1 is within range, it follows that there is a problem with the DPF 31.

If, at step 105, it is determined that the O2 levels O2_2 measured by the second sensor arrangement 37 are within (=target 2) the second predetermined range, then, at step 109, the controller 39 calculates whether SCR, 33 efficiency SCReff.2 is greater than or equal to (>=target4) a predetermined efficiency target.

If, during normal engine operation at step 109, it is determined that SCR 33 efficiency SCReff.2 is, less than the predetermined efficiency target (<target4), then it is determined at step 111 that there is a problem with the SCR. If O2_1 and O2_2 are within desired ranges, it can be concluded that the DOC 29 and DPF 31 are both operating properly and, if SCReff.2 is less than the predetermined range, by process of elimination, it is reasonable to conclude that there is a problem with the SCR 33.

If, during normal engine operation at step 109, it is determined that the SCR 33 efficiency SCReff.2 is greater than or equal to the predetermined efficiency target (>=target4), then, at step 113, it is determined that the DOC, the DPF, and the SCR are functioning properly.

If, at step 103, it is determined that the O2 levels measured by the first sensor arrangement 35 are outside (i.e. above) the first predetermined range, then, at step 115, the second sensor arrangement 37 senses whether O2 levels O2_2 measured by the second sensor arrangement are within (=target2) or outside (i.e. above) (>target2) a second predetermined range of O2 levels.

If, at step 115, it is determined that the O2 levels O2_2 measured by the second sensor arrangement 37 are within the second predetermined range (=target 2), then it is determined at step 117 that the DOC 29 is not functioning properly. When O2_1 is high (>target1), it means either that the DOC 29 is not converting an expected percentage of fuel injected or that the AHI 41 is not injecting the expected amount of fuel. When O2_2 is within range (=target 2), it means that the AHI 41 is injecting the expected amount of fuel. Therefore, it can be concluded that there is a problem with the DOC 29.

If, at step 115, it is determined that the O2 levels O2_2 measured by the second sensor arrangement 37 are outside (i.e. above) the second predetermined range (>target2) then, at step 119, it is determined whether the SCR 33 efficiency SCReff.1 is below (<target3) the predetermined target efficiency.

If, at low temperature operating conditions at step 119, is determined that the SCR 33 efficiency SCReff.1 is below the predetermined efficiency target (<target3), then, at step 121, it is determined that the DOC and the DPF are not functioning properly. If O2_1 and O2_2 are both high (>target 1 and >target 2), this means that the DOC 29 and/or the DPF are not converting the expected percentage of fuel injected, or that the AHI 41 is not injecting the expected amount of fuel for the DOC and/or the DPF to convert. When SCReff.1 is checked to detect whether the feedgas into the SCR 33 has a proper NO/NO2 ratio, a low NO/NO2 ratio (<=target 3) means that the DOC 29 and the DPF 31 are not working properly.

If an AHI is provided and, during low temperature operating conditions at step 119, it is determined that the SCR 33 efficiency SCReff.1 is not less than the predetermined efficiency target (>xtarget3), then, at step 123, it is determined that the AHI is not functioning properly, if O2_1 and O2_2 are both high (>target 1 and >target 2), this means that the DOC 29 and/or the DPF are not converting the expected percentage of fuel injected, or that the AHI 41 is not injecting the expected amount of fuel for the DOC and/or the DPF to convert. When SCReff.1 is checked to detect whether the feedgas into the SCR 33 has a proper NO/NO2 ratio, a high NO/NO2 ratio (>=target 3) (indicating a proper NO/NO2 ratio) means that the DOC 29 and the DPF 31 are working properly and it can be concluded that the AHI 41 is not operating properly.

If a problem with one or more of the DOC 29, the DPF 31, the SCR 33, or the AHI 41 is diagnosed according to any of the foregoing techniques the controller 39 can be configured to send a signal to an operator or a vehicle management system advising of the need for corrective measures or repairs, or to cause the vehicle to shut down.

The present invention permits use of equipment that already exists in EATS of most diesel engine arrangements to monitor and provide a diagnosis of problems with EATS components (DOC, DPF, SCR, AHI), thereby reducing or eliminating the need for specialized equipment, for more complicated monitoring procedures, or for procedures relying simply on expected equipment life.

In addition, when problems with EATS components are identified, this can function as a trigger for performing corrective measures in the engine arrangement. For example, when a problem with the DOC 29 is identified, the temperature enable condition for injection by the AHI 41 can be raised to compensate for a low hydrocarbon conversion efficiency problem and avoid hydrocarbon slip through a bad DOC. When a problem with the DPF 31 is identified, the engine control strategy can be altered to result in low NOx combustion so that low engine-out NOx will mitigate the impact of SCR problem to the environment. When a problem with SCR 33 is identified, the engine control strategy can be alternated to result in low NOx combustion so that low engine-out NOx will mitigate the impact of the SCR problem in the exhaust. When a problem with the AHI 41 is identified, the engine control strategy can switch into a heat:mode operation to maximize the exhaust gas heat energy from the engine to compensate for the loss of heat that otherwise would be generated by the hydrocarbon injection.

The method and engine arrangement according to the present invention of various advantages, including improving and facilitating the operation of monitoring and diagnostic equipment without the need for highly specialized components, without the need to add substantial new components, and without increased risk of damage to sensitive equipment. The invention can facilitate monitoring and diagnosing by assessing data that in many cases is ordinarily already collected, thereby reducing the need for additional processing capacity of the processing equipment for the engine arrangement.

In the present application, the use of terms such as "including" is open-ended and is intended to have the same meaning as terms such as "comprising" and not preclude the presence of other structure, material, or acts. Similarly, though the use of terms such as "can" or "may", is intended to be open-ended and to reflect that structure, material, or acts are not necessary, the failure to use such terms is not intended to reflect that structure, material, or acts are essential. To the extent that structure material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method for monitoring components in an exhaust aftertreatment system (EATS) comprising, in order from upstream to downstream, a diesel oxidation catalyst (DOC), a diesel particulate filter (DPF), and a selective catalytic reduction catalyst (SCR), the method comprising:
    measuring a first O2 level at a first location between the DOC and the DPF;
    measuring a second O2 level at a second location downstream of the SCR;
    measuring a first NOx level at the first location;
    measuring a second NOx level at the second location;
    calculating SCR efficiency based on the first and second NOx levels; and
    determining whether the DOC, the DPF, and the SCR are functioning properly based on:
        whether the first O2 level is within a first O2 target,
        whether the second O2 level is within a second O2 target, and
        whether SCR efficiency is within an SCR efficiency target.

2. The method as set forth in claim 1, comprising determining that the DOC is not functioning properly when the first O2 level is outside the first O2 target, and the second O2 level is within the second O2 target.

3. The method as set forth in claim 1, comprising determining that the DOC is not functioning properly when the first O2 level is outside the first O2 target, the second O2 level is within the second O2 target, and the SCR efficiency is below the SCR efficiency target.

4. The method as set forth in claim 3, comprising determining that the DPF is not functioning properly when the first O2 level is outside the first O2 target, the second O2 level is within the second O2 target, and the SCR efficiency is below the SCR efficiency target.

5. The method as set forth in claim 1, comprising determining that the DPF is not functioning properly when the first O2 level is within the first O2 target, and the second O2 level is outside the second O2 target.

6. The method as set forth in claim 1, comprising determining that the DPF is not functioning properly when the first O2 level is outside the first O2 target, the second O2 level is outside the second O2 target, and the SCR efficiency is below the SCR efficiency target.

7. The method as set forth in claim 1, wherein the EATS includes an aftertreatment hydrocarbon injection nozzle (AHI) upstream of the DOC, the method comprising determining whether the AHI is functioning properly based on:
    whether the first O2 level is within the first O2 target,
    whether the second O2 level is within the second O2 target, and
    whether SCR, efficiency is within the SCR efficiency target.

8. The method as set forth in claim 7, comprising determining that the AHI is not functioning properly when the first O2 level is outside the first O2 target, the second O2 level is outside the second O2 target, and the SCR efficiency is greater than or equal to the SCR efficiency target.

9. The method as set forth in claim 1, comprising determining that the SCR is not functioning properly when the first O2 level is within the first O2 target, the second O2 level is within the second O2 target, and the SCR efficiency is below the SCR efficiency target.

10. The method as set forth in claim 1, comprising determining that the DOC, the DPF, and the SCR are functioning properly when the first O2 level is within the first O2 target, the second O2 level is within the second O2 target, and the SCR efficiency is greater than or equal to the SCR efficiency target.

11. An engine arrangement with an exhaust after treatment system (EATS) monitoring arrangement, comprising:
an engine with an exhaust line;
an EATS attached to the exhaust line, the EATS comprising, in order from upstream to downstream, a diesel oxidation catalyst (DOC), a diesel particulate filter (DPF), and a selective catalytic reduction catalyst (SCR);
means for measuring a first O2 level at a first location between the DOC and the DPF;
means for measuring a second O2 level at a second location downstream of the SCR;
means for measuring a first NOx level at the first location;
means for measuring a second NOx level at the second location; and
a controller configured to calculate SCR efficiency based on the first and second NOx levels and to determine whether the DOC, the DPF, and the SCR are functioning properly based on:
whether the first O2 level is within a first O2 target,
whether the second O2 level is within a second O2 target, and
whether SCR efficiency is within an SCR efficiency target.

12. The engine arrangement as set forth in claim 11, wherein the controller is configured to S determine that the DOC is not functioning properly when the first O2 level is outside the first O2 target, and the second O2 level is within the second O2 target.

13. The engine arrangement as set forth in claim 11, wherein the controller is configured to determine that the DOC is not functioning properly when the first O2 level is outside the first O2 target, the second O2 level is within the second O2 target, and the SCR efficiency is below the SCR efficiency target.

14. The engine arrangement as set forth in claim 13, wherein the controller is configured to determine that the DPF is not functioning properly when the first O2 level is outside the first O2 target, the second O2 level is within the second O2 target, and the SCR efficiency is below the SCR efficiency target.

15. The engine arrangement as set forth in claim 11, wherein the comforter is configured to determine that the DPF is not functioning properly when the first O2 level is within the first O2 target, and the second O2 level is outside the second O2 target.

16. The engine arrangement as set forth in claim 11, wherein the controller is configured to determine that the DPF is not functioning properly when the first O2 level is outside the first O2 target, the second O2 level is outside the second O2 target, and the SCR efficiency is below the SCR efficiency target.

17. The engine arrangement as set forth in claim 11, wherein the EATS includes an aftertreatment hydrocarbon injection nozzle (AHI) upstream of the DOC, and the controller is configured to determine whether the AHI is functioning properly based on:
whether the first O2 level is within the first O2 target,
whether the second O2 level is within the second O2 target, and
whether SCR efficiency is within the SCR efficiency target.

18. The engine arrangement as set forth in claim 17, wherein the controller is configured to determine that the AHI is not functioning properly when the first O2 level is outside the first O2 target, the second O2 level is outside the second O2 target, and the SCR efficiency is below the SCR efficiency target.

19. The engine arrangement as set forth in claim 11, wherein the controller is configured to determine that the SCR is not functioning properly when the first O2 level is within the first O2 target, the second O2 level is within the second O2 target, and the SCR efficiency is below the SCR efficiency target.

20. The engine arrangement as set forth in claim 11, wherein the controller is configured to determine that the DOC, the DPF, and the SCR are functioning properly when the first O2 level is within the first O2 target, the second O2 level is within the second O2 target, and the SCR efficiency is greater than or equal to the SCR efficiency target.

* * * * *